United States Patent [19]

Kuwabara et al.

[11] Patent Number: 5,078,839
[45] Date of Patent: Jan. 7, 1992

[54] METHOD FOR CENTERING IN AN ELECTROLYTIC FINISHING SYSTEM

[75] Inventors: Youhei Kuwabara; Haruki Sugiyama, both of Fukuroi, Japan

[73] Assignee: Shizuoka Seiki Co., Ltd., Fukuroi, Japan

[21] Appl. No.: 474,118

[22] PCT Filed: Sep. 6, 1989

[86] PCT No.: PCT/JP89/00914
§ 371 Date: Apr. 30, 1990
§ 102(e) Date: Apr. 30, 1990

[87] PCT Pub. No.: WO90/02625
PCT Pub. Date: Mar. 22, 1990

[30] Foreign Application Priority Data
Sep. 7, 1988 [JP] Japan ................ 63-224197

[51] Int. Cl.$^5$ .................. B23H 3/00; B23H 11/00
[52] U.S. Cl. .................. 204/129.2; 204/129.5
[58] Field of Search .......... 204/129.2, 212, 224 M, 204/225, 129.5, 129.55

[56] References Cited
U.S. PATENT DOCUMENTS

| 3,433,919 | 3/1969 | Braudeau et al. | 204/129.5 X |
| 3,849,272 | 11/1974 | Zubak | 204/224 M X |
| 4,101,405 | 7/1978 | Inoue | 204/129.2 X |
| 4,104,503 | 8/1978 | Di Piazza et al. | 204/224 M X |
| 4,170,528 | 10/1979 | Mathews | 204/129.2 |
| 4,353,785 | 10/1982 | Inoue | 204/129.2 |
| 4,439,660 | 3/1984 | Inoue | 204/129.55 |
| 4,454,516 | 6/1984 | Schaffner | 204/224 M X |
| 4,608,476 | 8/1986 | Shimizu | 204/129.5 X |
| 4,800,006 | 1/1989 | Kuwabara et al. | 204/129.43 |
| 4,846,944 | 7/1989 | Adachi | 204/129.2 |

FOREIGN PATENT DOCUMENTS
62-58850 12/1987 Japan .
63-283818 11/1988 Japan .

Primary Examiner—Donald R. Valentine
Attorney, Agent, or Firm—Armstrong, Nikaido, Marmelstein, Kubovcik & Murray

[57] ABSTRACT

A workpiece is moved in a plus direction or in a minus direction or in a minus direction on an X-axis to be contacted with an electrode. The moved distance Lx is calculated. The workpiece is moved in the opposite direction by the Lx/2. Similarly, the workpiece is moved in a plus direction or in a minus direction on a Y-axis and returned by the Ly/2.

2 Claims, 15 Drawing Sheets

200 START
201 FIX WORK
202 FIX ELECTRODE
203 LOWER ELECTRODE
204 START AUTOMATIC CENTERING
205 MOVE WORK IN -X DIRECTION
206 DETECT CONTACT
207 DETERMINE DISCONNECTING DIRECTION
208 MOVE WORK IN +X DIRECTION
209 DETECT CONTACT
210 CALCULATE Lx and Lx/2
211 MOVE WORK IN -X DIRECTION BY Lx/2
212 MOVE WORK IN -Y DIRECTION
213 DETECT CONTACT
214 DETERMINE DISCONNECTING DIRECTION
215 MOVE WORK IN +Y DIRECTION
216 DETECT CONTACT
217 CALCULATE Ly and Ly/2
218 MOVE WORK IN -Y DIRECTION BY Ly/2
219 LOWER ELECTRODE
220 DETECT CONTACT
221 RAISE ELECTRODE BY A PREDETERMINED DISTANCE

| 9 | MOTOR CONTROL SECTION | 13 | INPUT DEVICE |
| 10 | MACHINING CONDITION CONTROL SECTION | 14 | ELECTROLYTE FILTERING DEVICE |
| | | 25 | CHARGE/DISCHARGE SECTION |
| 11 | ELECTROLYTE FLOW CONTROL SECTION | 24 | DIRECT CURRENT SOURCE |

| | |
|---|---|
| 26 | TRANSFORMER |
| 27 | RECTIFIER |
| 31 | CHARGE SWITCH |

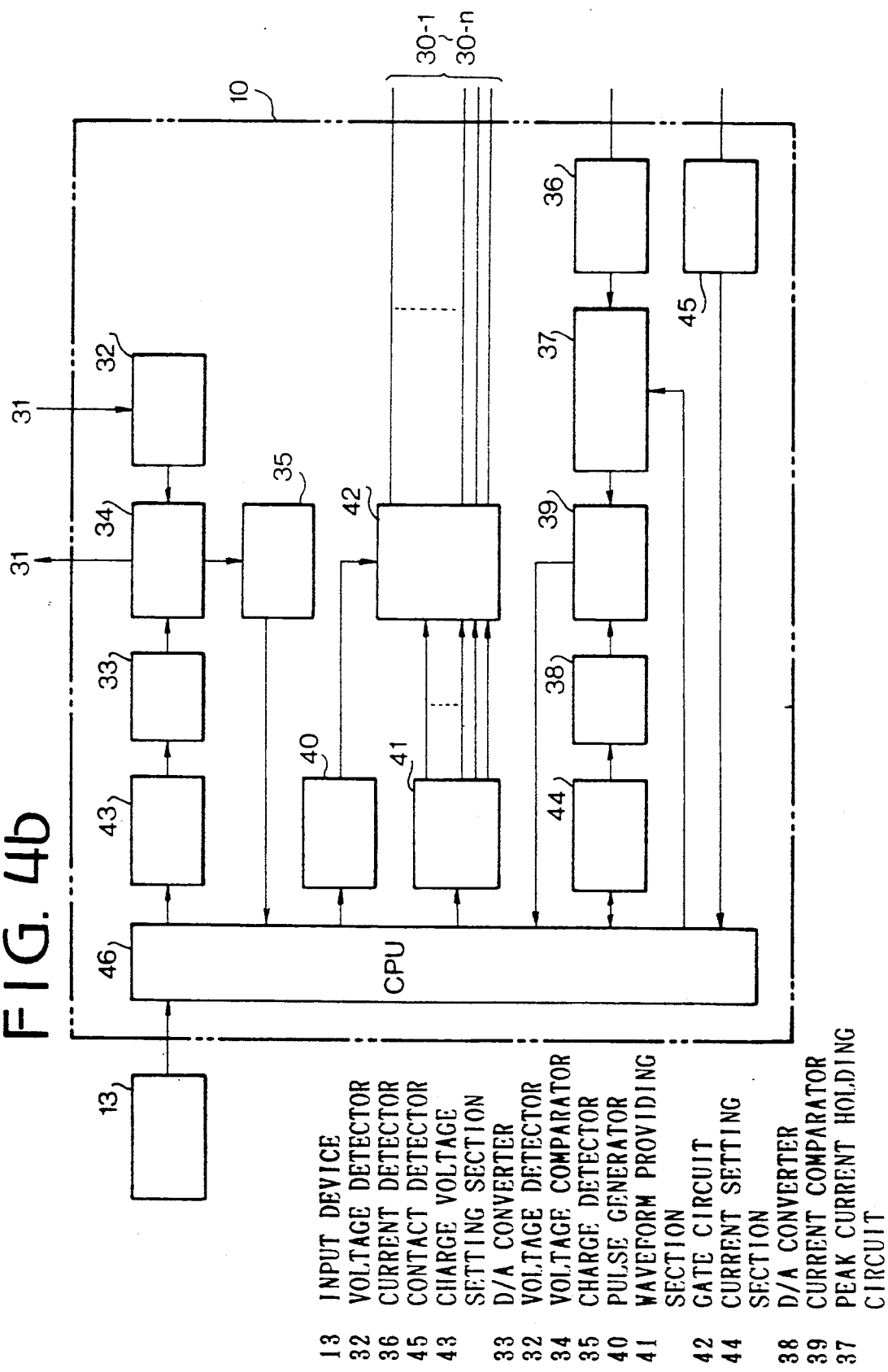

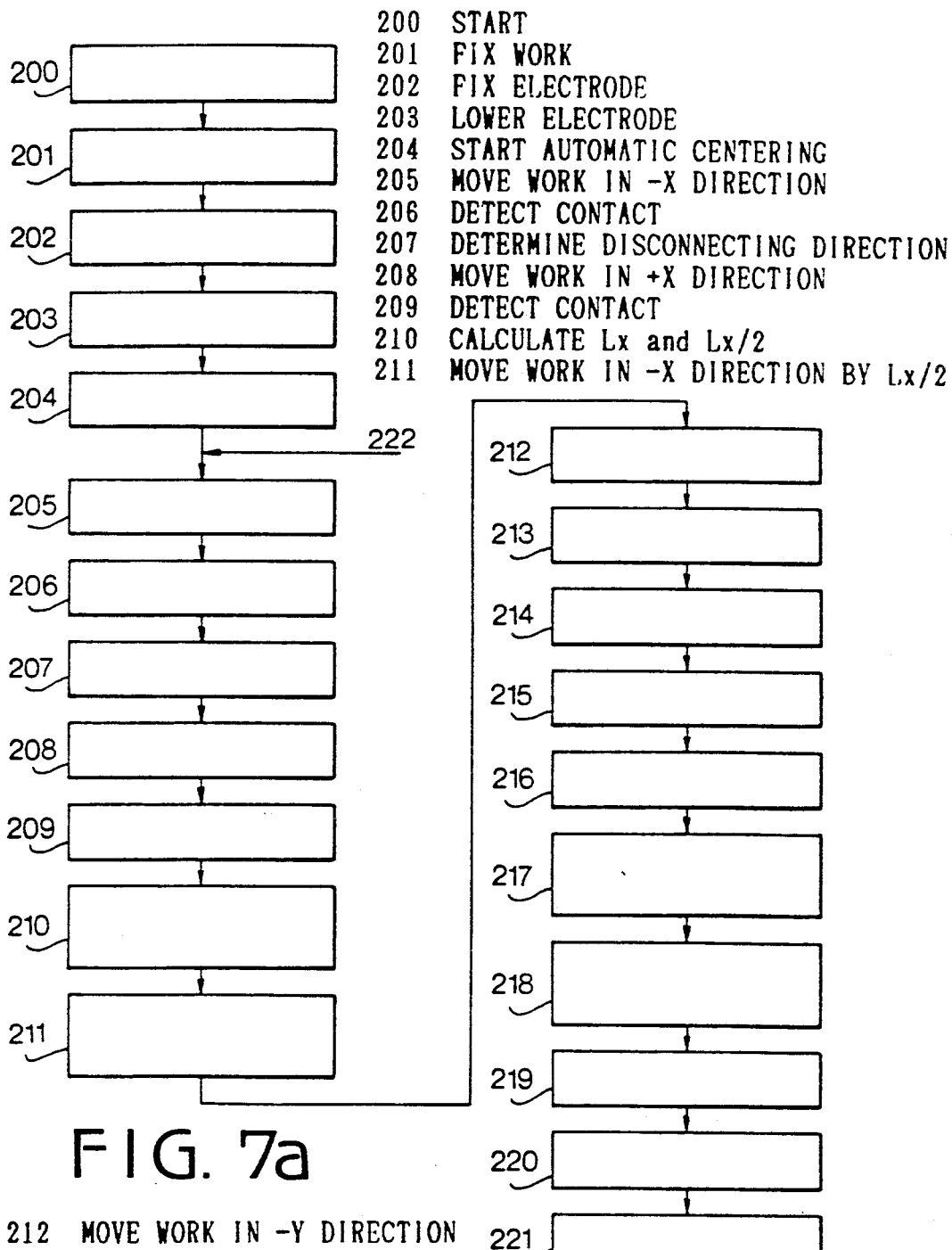

FIG. 7a

| 200 | START |
| 201 | FIX WORK |
| 202 | FIX ELECTRODE |
| 203 | LOWER ELECTRODE |
| 204 | START AUTOMATIC CENTERING |
| 205 | MOVE WORK IN -X DIRECTION |
| 206 | DETECT CONTACT |
| 207 | DETERMINE DISCONNECTING DIRECTION |
| 208 | MOVE WORK IN +X DIRECTION |
| 209 | DETECT CONTACT |
| 210 | CALCULATE Lx and Lx/2 |
| 211 | MOVE WORK IN -X DIRECTION BY Lx/2 |
| 212 | MOVE WORK IN -Y DIRECTION |
| 213 | DETECT CONTACT |
| 214 | DETERMINE DISCONNECTING DIRECTION |
| 215 | MOVE WORK IN +Y DIRECTION |
| 216 | DETECT CONTACT |
| 217 | CALCULATE Ly and Ly/2 |
| 218 | MOVE WORK IN -Y DIRECTION BY Ly/2 |
| 219 | LOWER ELECTRODE |
| 220 | DETECT CONTACT |
| 221 | RAISE ELECTRODE BY A PREDETERMINED DISTANCE |

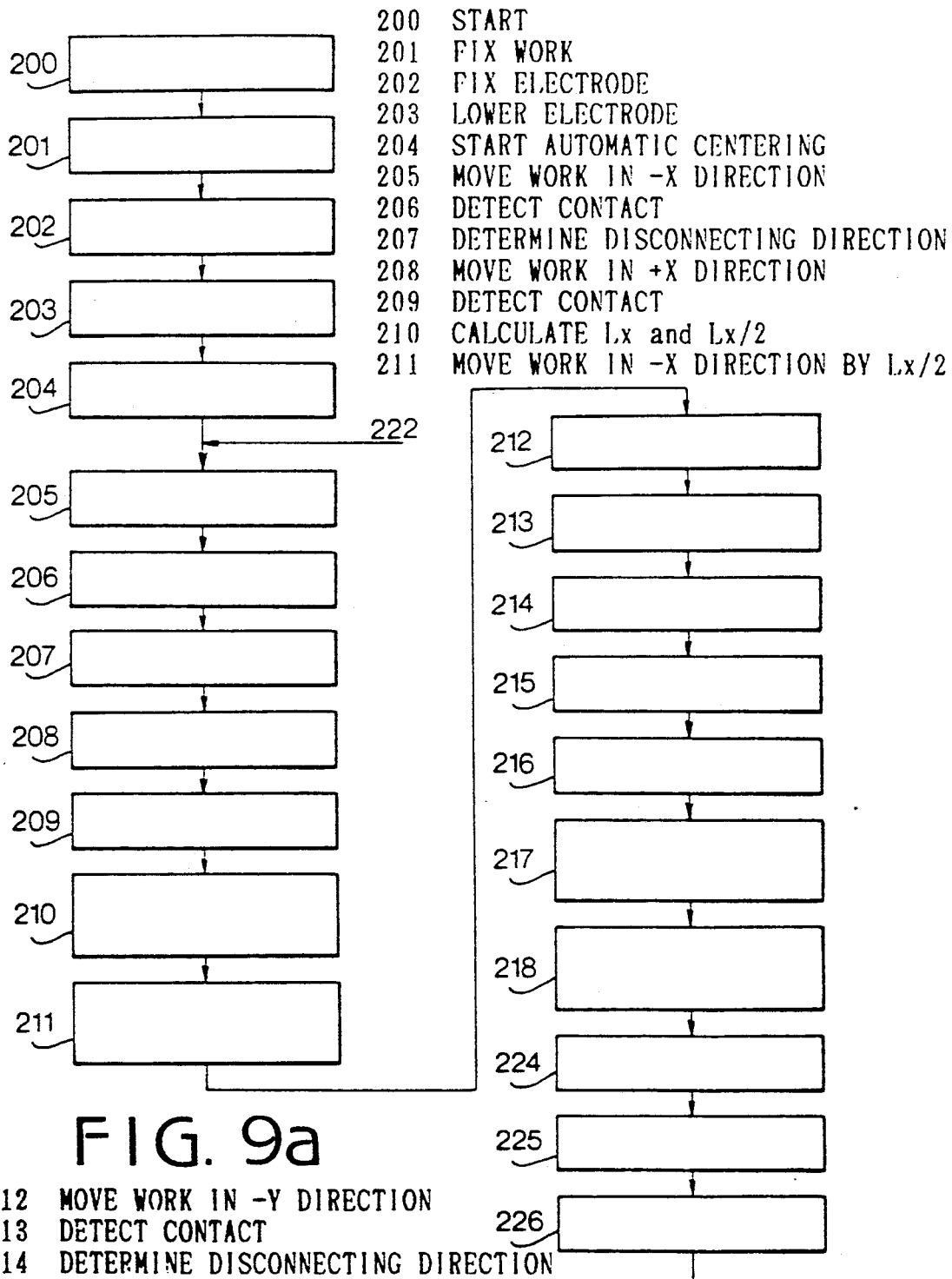

FIG. 9a

| # | Step |
|---|---|
| 200 | START |
| 201 | FIX WORK |
| 202 | FIX ELECTRODE |
| 203 | LOWER ELECTRODE |
| 204 | START AUTOMATIC CENTERING |
| 205 | MOVE WORK IN -X DIRECTION |
| 206 | DETECT CONTACT |
| 207 | DETERMINE DISCONNECTING DIRECTION |
| 208 | MOVE WORK IN +X DIRECTION |
| 209 | DETECT CONTACT |
| 210 | CALCULATE Lx and Lx/2 |
| 211 | MOVE WORK IN -X DIRECTION BY Lx/2 |
| 212 | MOVE WORK IN -Y DIRECTION |
| 213 | DETECT CONTACT |
| 214 | DETERMINE DISCONNECTING DIRECTION |
| 215 | MOVE WORK IN +Y DIRECTION |
| 216 | DETECT CONTACT |
| 217 | CALCULATE Ly and Ly/2 |
| 218 | MOVE WORK IN -Y DIRECTION BY Ly/2 |
| 224 | ROTATE ELECTRODE IN +C DIRECTION |
| 225 | DETECT CONTACT |
| 226 | DETERMINE DISCONNECTING DIRECTION |

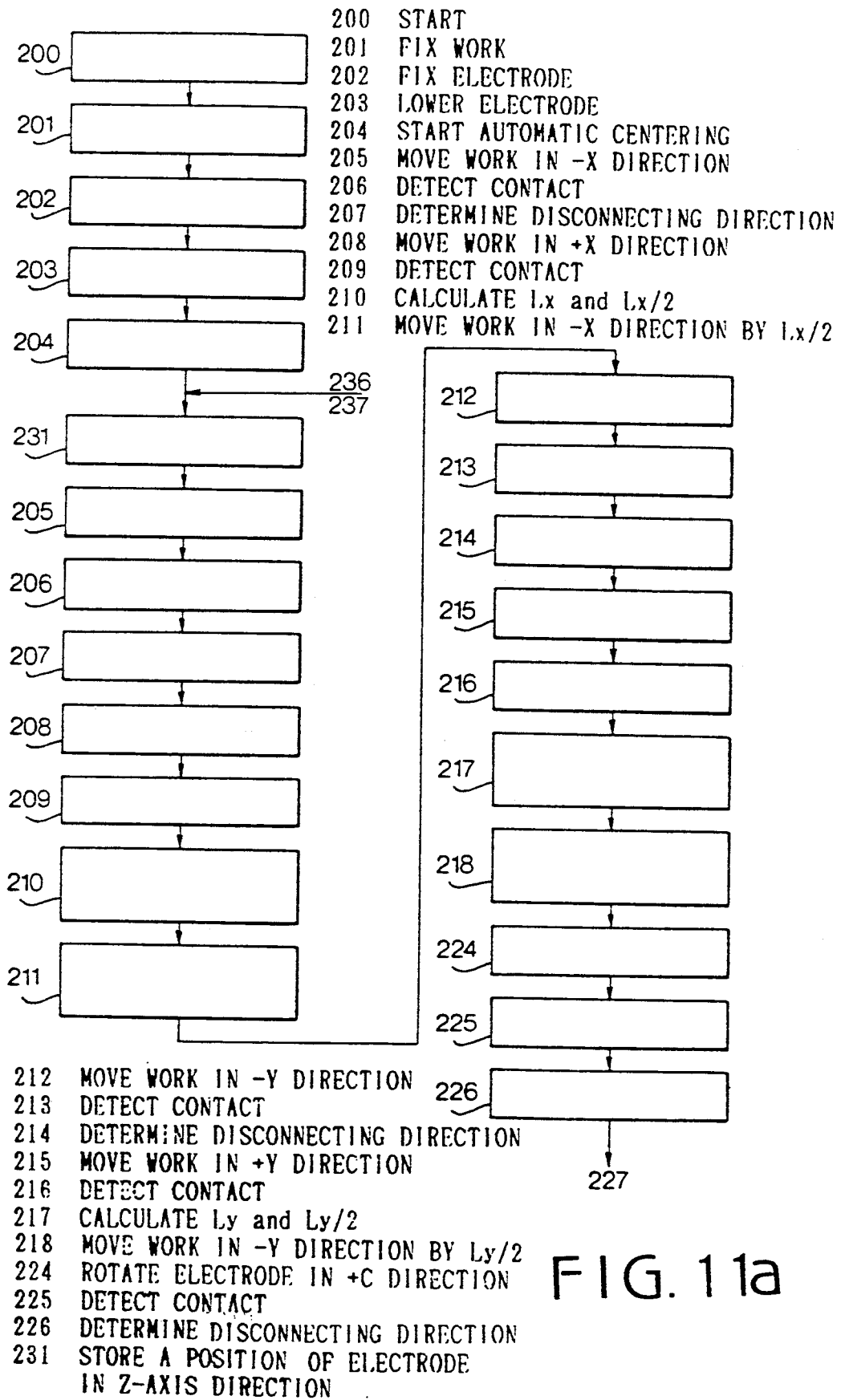

FIG. 11a

200 START
201 FIX WORK
202 FIX ELECTRODE
203 LOWER ELECTRODE
204 START AUTOMATIC CENTERING
205 MOVE WORK IN -X DIRECTION
206 DETECT CONTACT
207 DETERMINE DISCONNECTING DIRECTION
208 MOVE WORK IN +X DIRECTION
209 DETECT CONTACT
210 CALCULATE Lx and Lx/2
211 MOVE WORK IN -X DIRECTION BY Lx/2

212 MOVE WORK IN -Y DIRECTION
213 DETECT CONTACT
214 DETERMINE DISCONNECTING DIRECTION
215 MOVE WORK IN +Y DIRECTION
216 DETECT CONTACT
217 CALCULATE Ly and Ly/2
218 MOVE WORK IN -Y DIRECTION BY Ly/2
224 ROTATE ELECTRODE IN +C DIRECTION
225 DETECT CONTACT
226 DETERMINE DISCONNECTING DIRECTION
231 STORE A POSITION OF ELECTRODE IN Z-AXIS DIRECTION

METHOD FOR CENTERING IN AN ELECTROLYTIC FINISHING SYSTEM

TECHNICAL FIELD

The present invention relates to a method for centering in an electrolytic finishing system, and more particularly to a method for centering a workpiece having a three-dimensional shaped surface and an electrode in the system.

BACKGROUND ART

In a conventional electrolytic machine, liquid electrolyte such as sodium nitrate solution or sodium chloride solution is continuously passed between an electrode and a work at a high speed during machining, so that residual products such as particles of eroded metal from the work, hydrogen gas, and others are discharged from the gap between the electrode and the workpiece and a direct current voltage in the form of pulses is applied between the workpiece and the electrode for finishing the surface of the workpiece.

The applicant of the present invention have proposed electrolytic finishing systems in which a workpiece having a complicated three-dimensional shaped recess is finished by electrolytic machining (see Japanese Patent Application Laid-Open 63-283818 and U.S. Pat. No. 4,800,006). In the system, since an electrode has a surface corresponding to the recessed surface of the workpiece, it is very difficult to center the workpiece with the electrode and a long time is consumed for the centering operation. Japanese Patent Application Publication 62-58850 discloses a centering method in which deflection of an electrode is automatically corrected. However, such a method can not be applied to the system employed with a pair of electrodes consisting of the workpiece having three-dimensional shaped recess and the electrode.

The object of the present invention is to provide a centering method in which the workpiece is a automatically centered with the electrode, thereby reducing operation time for centering.

DISCLOSURE OF THE INVENTION

According to the present invention, there is provided a method for centering in an electrolytic finishing system comprising locating a workpiece and an electrode having a surface similar to the workpiece in profile in parallel with a standard plane and fixing them, facing a working surface of the workpiece and an electrode surface each other, moving either of the workpiece and the electrode in a plus direction and in a minus direction on an X-axis to contact with each other, detecting the contact position, calculating a moving distance Lx of the moved object in the X-axis, moving the object in the opposite direction by the Lx/2, moving either of the workpiece and the electrode in a plus direction and in a minus direction on Y-axis to contact with each other, detecting the contact position, calculating a moving distance Ly of the moved object in the Y-axis, moving the object in the opposite direction by the Ly/2, and lowering the electrode to be contacted with the workpiece, and then raising the electrode by a predetermined distance.

In an aspect of the invention, the method further comprising rotating either of the workpiece and the electrode in a plus direction and in a minus direction with respect to Z-axis to contact with each other, detecting the contact position, calculating a rotating angle Lc of the moved object, rotating the object in the opposite direction by the Lc/2.

BRIEF DESCRIPTION OF THE DRAWINGS

FIGS. 4a and 4b are block diagrams showing a system for supplying current to an electrode and a workpiece;

FIG. 7a and 7b are flowcharts showing an operation of the system;

FIGS. 9a and 9b are flowcharts showing a second embodiment of the present invention;

FIGS. 11a and 11b are flowcharts showing a third embodiment of the present invention.

BEST MODE FOR EMBODYING THE INVENTION

The present invention will be described hereinafter in detail with reference to the accompanying drawings.

FIGS. 1 to 8 show a system of the present invention.

Figure 1:
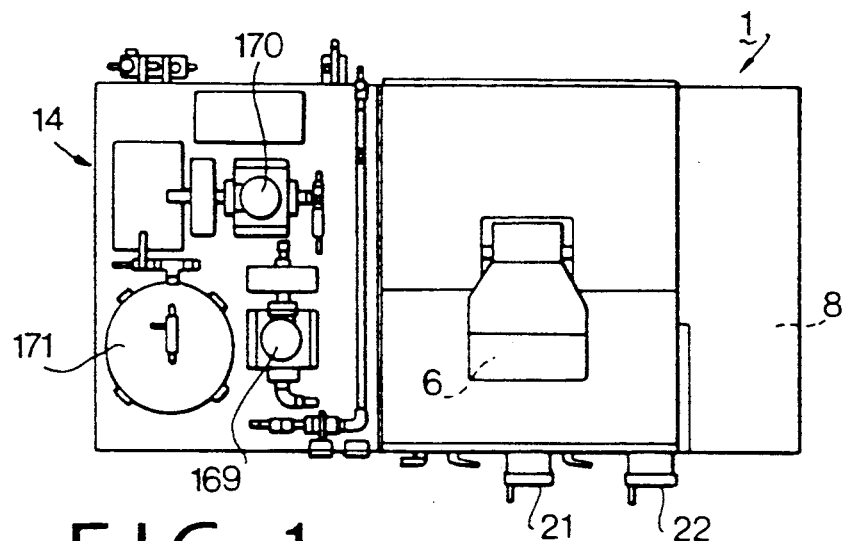
FIG. 1 is a plan view of an electrolytic finishing machine according to the present invention.
Figure 2:
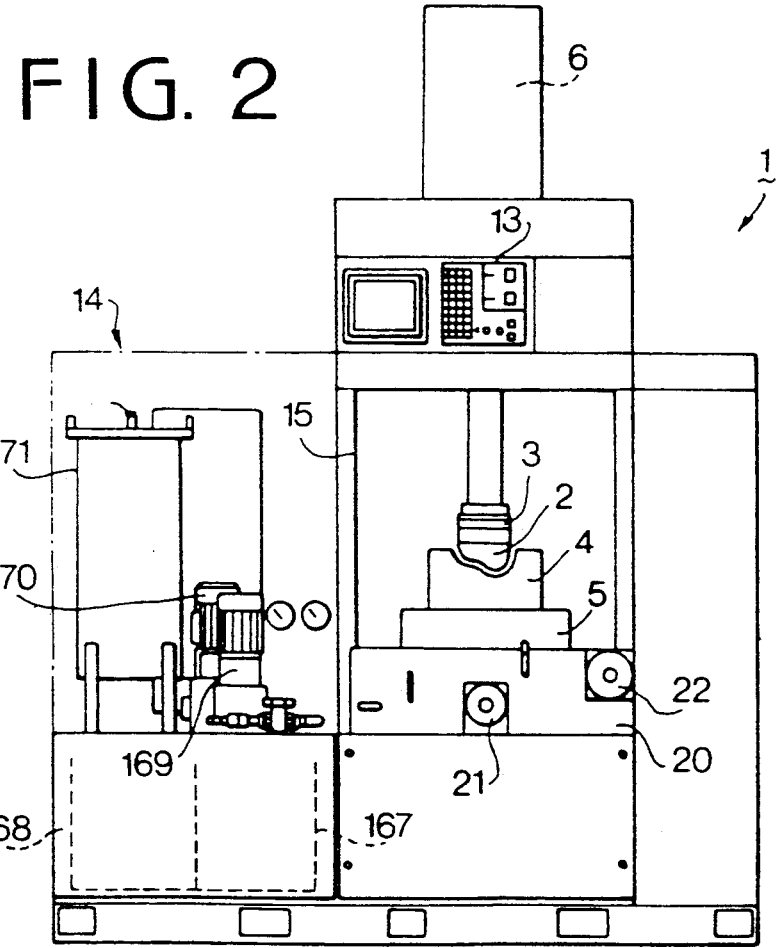
FIG. 2 is a front view of the machine.
Figure 3:
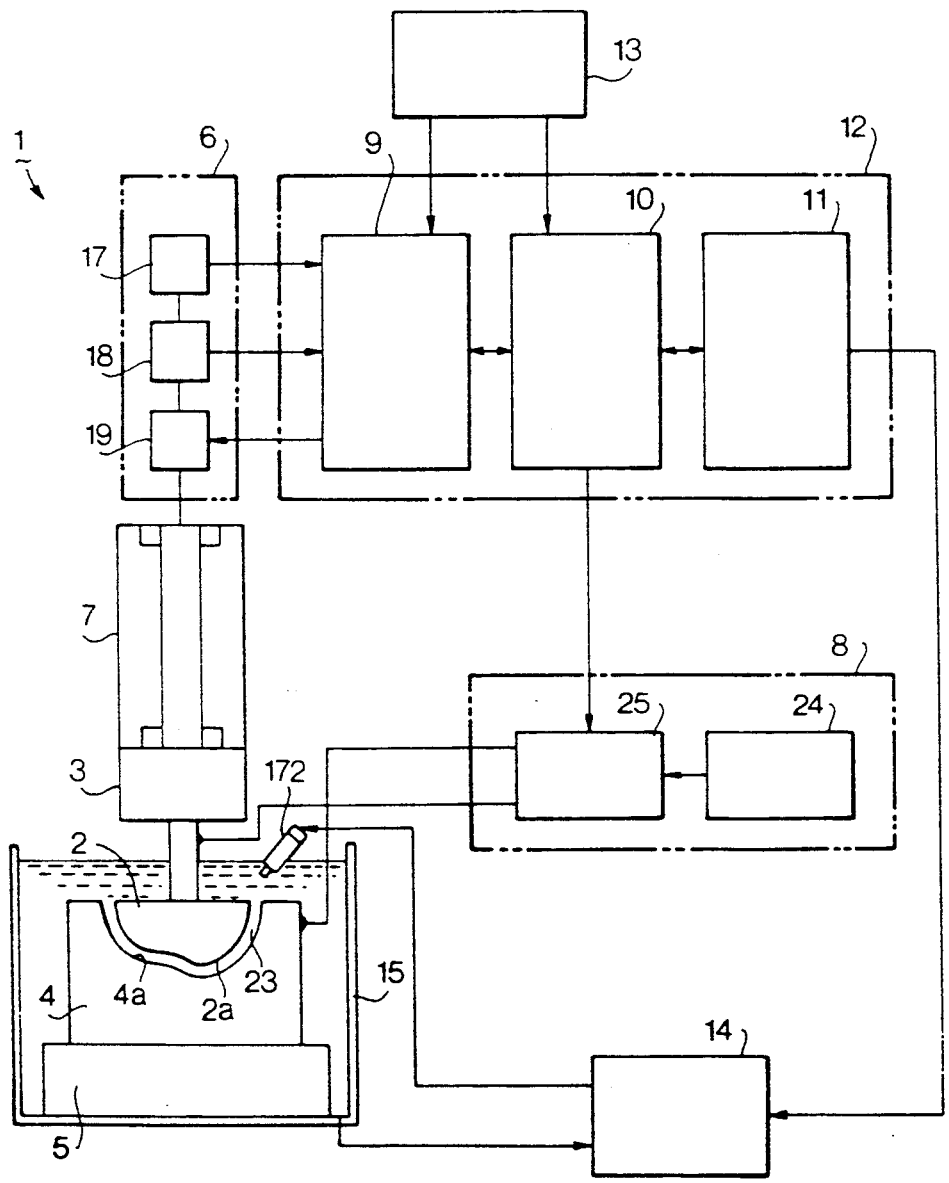
FIG. 3 is a schematic illustration showing a system of the electrolytic finishing machine.

Referring to FIGS. 1 to 3, an electrolytic finishing machine 1 has an electrode holding device 3 for holding an electrode 2, a workpiece fixing device 5 for fixing a workpiece 4, an electrode driving direetion converter 7 for changing rotary output of an electrode driving device 6 into an axial movement, a power source device 8 for generating a pulse, a control unit 12 having a motor control section 9, a machining condition control section 10, and an electrolyte flow control section 11, an input device 13 for inputting machining conditions, an electrolyte filtering device 14, and an electrolyte tank 15.

The electrode 2 made of copper or graphite which was used at electrical discharge machining for roughly machining the workpiece 4 is secured to the lower end of a rod of the electrode holding device 3. The holding device 3 is operatively connected to the electrode driving device 6 through the converter 7 so that the device 3 is vertically moved for moving the electrode 2 in the Z-axis direction.

The driving device 6 has a rotary encoder 17, a tachogenerator 18 and a motor 19. Output signals of the encoder 17 and the tacho-generator 18 are supplied to the motor control section 9 of the control unit 12, and the motor 19 is operated by a control signal from the motor control section 9. The converter 7 is arranged to change rotary output of the motor 19 in the device 6 into axial movement of the rod. Further, the electrode holding device 3 is rotated in the C direction (a rotating direction about the Z-axis) in accordance with a rotation of a motor (not shown) which is operated by a control signal from the control unit 12.

The work fixing device 5 is a table made of insulation such as granite or ceramic material and secured to an X-table of an X-Y table 20 together with a base plate of the electrolyte tank 15 with bolts. The workpiece 4 is secured to an upper surface of the device 5. Thus, the workpiece 4, device 5 and the tank 15 can be integrally moved in X and Y directions by operating handles 21 and 22 of the X-Y table 20 which are manually operated or automatically operated by control signals from the control unit 12.

The input device 13 is arranged to input various machining condition signals such as the material of the workpiece 4, surface areas S of the workpiece 4, grades of dimension accuracy, the pulse duration and the number of pulses per one machining cycle (at every one or more pulses) of a pulse current applied to the workpiece, and dimension of the gap δ between the electrode and the workpiece. The signals are fed to the motor control section 9 and the machining condition control section 10.

Referring to FIGS. 1 and 2, the electrolyte filtering device 14 comprises a dirty tank 167, a clean tank 168, pumps 169 and 170 and a filter 171, for filtering the electrolyte including residual products produced by machining operation. The device 14 is operated in response to signals from the electrolyte flow control section 11. The electrolyte including residual products is removed from the electrolyte tank 15 and fed to the dirty tank 167. The electrolyte is fed through the filter 171 from the dirty tank 167 by the pump 169 to the clean tank 168 which stores clean electrolyte. The electrolyte in the clean tank 168 is fed by the pump 170 to the tank 15. A nozzle 172 oriented to the gap 23 between the electrode 2 and the work 4 (FIG. 3) injects the clean electrolyte, thereby removing residual products from the gap 23.

Figure 4A:
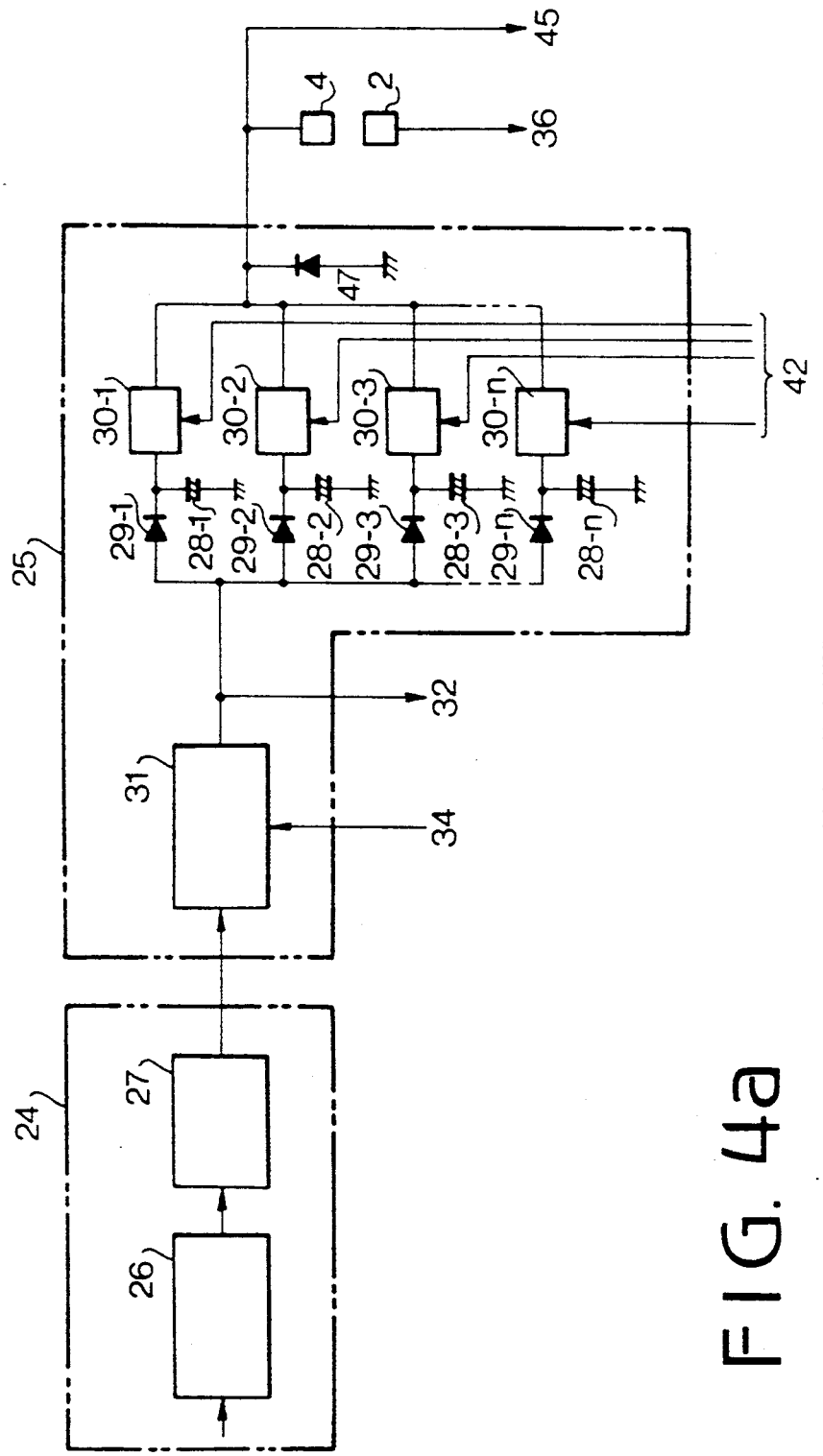

FIGS. 4a and 4b show block diagrams of the power source device 8 for supplying a predetermined pulse current to the electrode 2 and the workpiece 4 and the machining condition control section 10 of the control unit 12 for controlling the power source device 8.

The power source device 8 comprises a direct current source 24 and a charge/discharge section 25. The direct current source 24 has a transformer 26 for transforming the voltage into a predetermined value and a rectifier 27 for rectifying the voltage to obtain direct current.

The charge/discharge section 25 has a plurality of capacitors 28-1 to 28-n which are connected in parallel with each other, diodes 29-1 to 29-n for preventing reverse current to the current source, switches 30-1 to 30-n for generating pulses, and a charge switch 31 for connecting the direct current source 24 to capacitors 28-1 to 28-n to charge each capacitor to a set value.

The machining condition control section 10 for controlling the charge/discharge section 25 comprises a voltage detector 32 for detecting charge voltage applied to the capacitors 28-1 to 28-n, a voltage comparator 34 for comparing the charge voltage detected by the voltage detector 32 with a voltage from a D/A converter 33, and a charge detector 35 for detecting the completion of charging the capacitors 28-1 to 28-n in response to the output of the comparator 34. The control section 10 further comprises a current detector 36 for detecting the current of the electric charge discharged between the workpiece 4 and the electrode 2, a peak current holding circuit 37 for holding a peak current detected by the current detector 36, a current comparator 39 for comparing the peak current from the peak current holding circuit 37 with the current supplied from a D/A converter 38, a pulse generator 40 for generating pulses each having a predetermined pulse duration, a waveform providing section 41 for providing current waveform discharged in the gap 23 between the workpiece 4 and the electrode 2, a gate circuit 42 for supplying an operation signal to switches 30-1 to 30-n in response to signals from the pulse generator 40 and the waveform providing section 41, a charge voltage setting section 43 for setting charge voltage applied to the capacitors 28-1 to 28-n and producing a signal which is applied to the D/A converter 33, a current setting section 44 for setting a current applied to the gap 23 between the workpiece 4 and the electrode 2 and producing a signal which is applied to the D/A converter 38, a contact detector 45 for detecting the contact of the electrode 2 with the workpiece 4, and a CPU 46 applied with signals from the input device 13 to calculate machining and others. There is provided a diode 47 for preventing the switches 30-1 to 30-n from breaking down by reverse current.

Describing the control of the CPU 46, in response to a signal supplied from the input device 13, which represents the surface area S of the workpiece 4 and a pulse duration of a single pulse current applied to the gap 23, the CPU 46 calculates a charge voltage based on a datum from a memory. The charge voltage is determined to have a predetermined peak current density in a supplied pulse. A charge voltage signal corresponding to the calculated charge voltage is fed to the charge voltage setting section 43 of the control section 10.

When capacitors 28-1 to 28-n are charged up to a predetermined charge voltage, a charge completion signal is fed to CPU 46 from the charge detector 35. The CPU 46 supplies a control signal to gate circuit 42 through the pulse generator 40 and the waveform providing section 41 to open the gate. Thus, switches 30-1 to 30-n are selectively closed to discharge capacitors and the pulse current having a predetermined peak current density is applied to the workpiece and the electrode.

When the pulse current flows between the workpiece 4 and the electrode 2, the current is detected by the current detector 36 and a peak current thereof is preserved in the peak current holding circuit 37. The current comparator 39 compares the peak current from the circuit 37 with the current from the current setting section 44 by converting a digital signal to an analog signal in the D/A converter 38 and produces a compared signal which is supplied to the CPU 46.

In accordance with the signal, the CPU 46 controls the charge voltage set at the charge voltage setting section 43 so as to maintain the peak current density at a predetermined value. For example, if the peak current is smaller than the set value, the CPU 46 controls to increase the charge voltage. If the peak current is larger than the set value, the charge voltage is reduced.

Figure 5A:
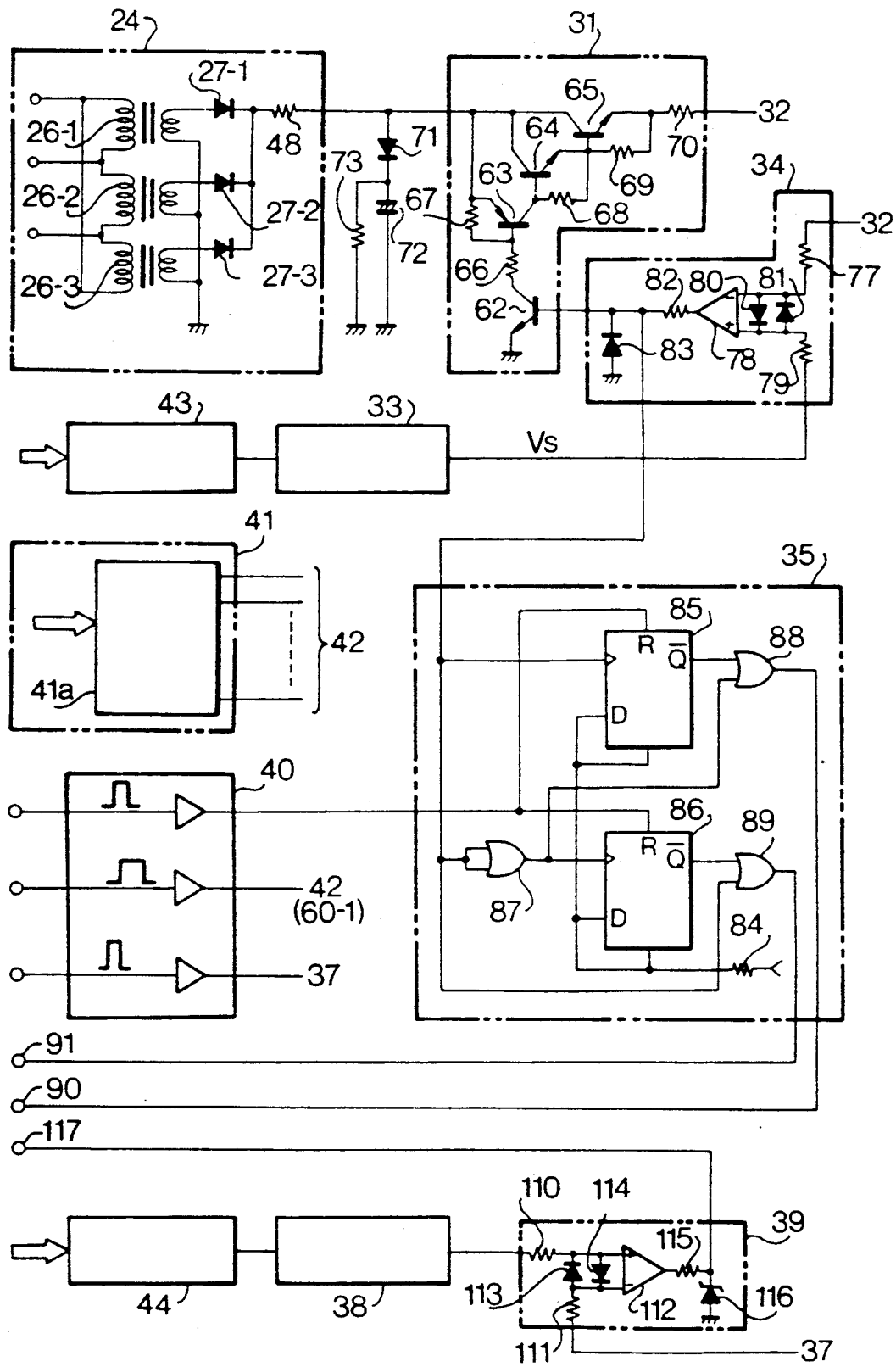
FIGS. 5a and 5b show circuits of the system.
Figure 5B:
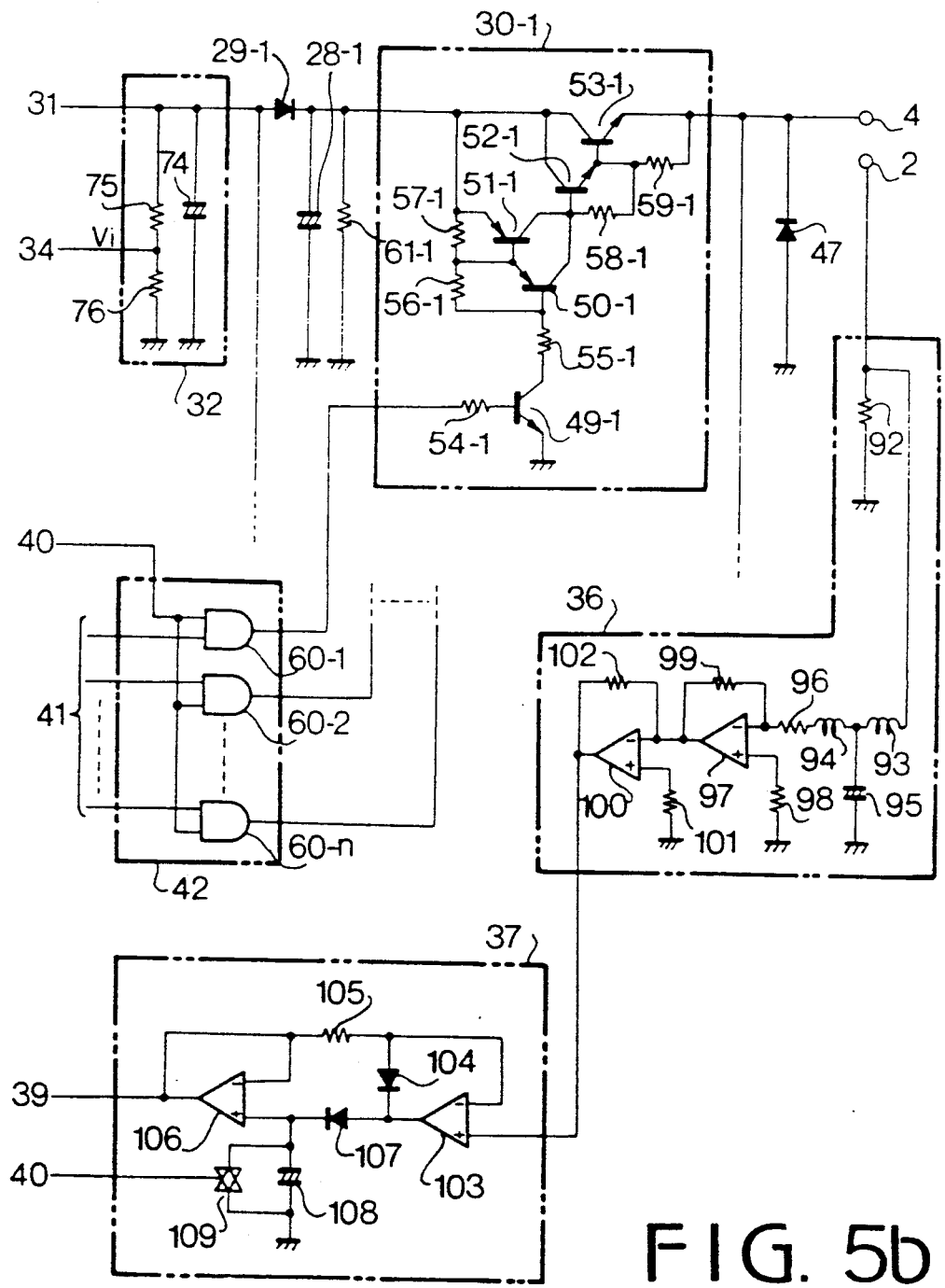

Referring to FIGS. 5a and 5b showing circuits of the system shown in FIGS. 4a and 4b, the same parts thereof are identified with the same reference numerals as FIGS. 4a and 4b. The direct current source 24 has coils 26-1 to 26-3 for reducing voltage to a predetermined value, and diodes 27-1 to 27-3 for rectifying the current so as to produce a direct current. The direct current is applied to the charge switch 31 through a resistor 48.

Since each of the switches 30-1 to 30-n has the same structure, the structure of the switch 30-1 will be described hereinafter. The switch 30-1 comprises five transistors 49-1 to 53-1 and six resistors 54-1 to 59-1. The transistor 49-1 is connected to the AND gate 60-1 of the gate circuit 42 through the resistor 54-1. The transistors 49-1 to 53-1 are sequentially turned on in response to the signal from the AND gate 60-1 to discharge the capacitor 28-1. Numeral 61-1 designates a resistor connected to the capacitor 28-1 in parallel.

The charge switch 31 comprises four transistors 62 to 65 and five resistors 66 to 70.

The voltage detector 32 has a capacitor 74 and resistors 75 and 76 connected in series each other and connected to the capacitor 74 in parallel. A detected charge voltage Vi divided across the resistors is applied to a comparator 78 in the voltage comparator 34 through a resistor 77. The other input of the comparator 78 is connected to an output of the D/A converter 33 through a resistor 79. Diodes 80 and 81 are connected between inputs of the comparator 78. An output signal of the comparator 78 is applied to the base of the transistor 62 of the charge switch 31 through a resistor 82 and a diode 83 which is connected to the ground.

The voltage comparator 34 compares a set charge voltage Vs from the D/A converter 33 with the detected charge voltage Vi from the voltage detector 32. The transistors 62 to 65 are controlled in response to the signal from the voltage comparator 34, such that a predetermined charge voltage is applied to the capacitors 28-1 to 28-n through the diodes 29-1 to 29-n. A diode 71 is connected between the source 24 and the switch 31 for protecting the switch 31. A cathode of the diode 71 is connected to the ground through a capacitor 72 and a resistor 73.

The charge voltage detector 35 comprises a pair of flip-flops (flip-flop is hereinafter called FF) 85 and 86 pulled up by a resistor 84, and three gates 87, 88 and 89. The output of the comparator 78 of the voltage comparator 34 is connected to a trigger terminal of the FF 85 and to a trigger terminal of the FF 86 through the gate 87. One of the outputs of the FF 85 is connected to a terminal 90 of the CPU 46 through the gate 88. One of the outputs of the FF 86 is connected to a terminal 91 of the CPU 46 through the gate 89. Thus, the CPU 46 detects a charge starting signal and a charge completion signal in accordance with terminals 90 and 91, respectively.

The current detector 36 is connected to the electrode 2 through a resistor 92 which is connected to the ground. The electrode 2 is further connected to one of inputs of an amplifier 97 through a filter comprising two coils 93 and 94 and a capacitor 95 for cutting of the noise, a resistor 96 connected to the filter in series and the other input of the amplifier 97 is connected to the ground through a resistor 98. An output of the amplifier 97 is connected to one of inputs of an amplifier 100, to which the input of the amplifier 97 is connected through a resistor 99. The output of the amplifier 100 is connected to the peak current holding circuit 37 to which the input of the amplifier 100 is connected through a resistor 102 for supplying a detected discharge current.

The peak current holding circuit 37 comprises an amplifier 103, one of inputs of which is connected to an output thereof through a diode 104. The other input is applied with the signal from the amplifier 100 of the current detector 36. The input of the amplifier 103 is connected to one of inputs of an amplifier 106 through a resistor 105. The output of the amplifier 103 is connected to the other input of the amplifier 106 through a diode 107. A capacitor 108 connected to the ground is connected to the other input of the amplifier 106. Across the capacitor 108, an analog switch 109 is connected, to which a pulse generator 40 is connected.

A peak current signal is applied to the current comparator 39 and the peak current is reset by a reset pulse from the pulse generator 40.

The current comparator 39 comprises a comparator 112 connected to the output of the amplifier 106 through a resistor 111 and applied with a signal from a D/A converter 38 through a resistor 110. Diodes 113 and 114 are connected between the inputs of the comparator 112 and resistors 110 and 111. An output of the comparator 112 is connected to a resistor 115 which is in turn connected to a constant voltage diode 116 connected to the ground, and to an input terminal 117 of the CPU 46.

The gate circuit 42 has AND gates 60-1 to 60-n connected to a temporary memory 41a of the waveform providing section 41 and an output terminal of the pulse generator 40. The AND gates 60-1 to 60-n are connected to the switches 30-1 to 30-n of the charge/discharge section 25 for controlling the discharge of the capacitors 28-1 to 28-n.

In accordance with an on-signal for the pulse generator 40 for producing a machining pulse, each of the AND gates 60-1 to 60-n are opened to produce an output signal, so that each of the transistors 49-1 to 49-n of the switches 30-1 to 30-n are selectively turned on corresponding to the current for obtaining a predetermined peak current density so s to discharge the capacitors 28-1 to 28-n. In accordance with an off-signal of the machining pulse, the AND gates 60-1 to 60-n are closed to turn off the transistors 49-1 to 49-n of the switches 30-1 to 30-n so as to stop the discharge of the capacitors 28-1 to 28-n.

Figure 6:
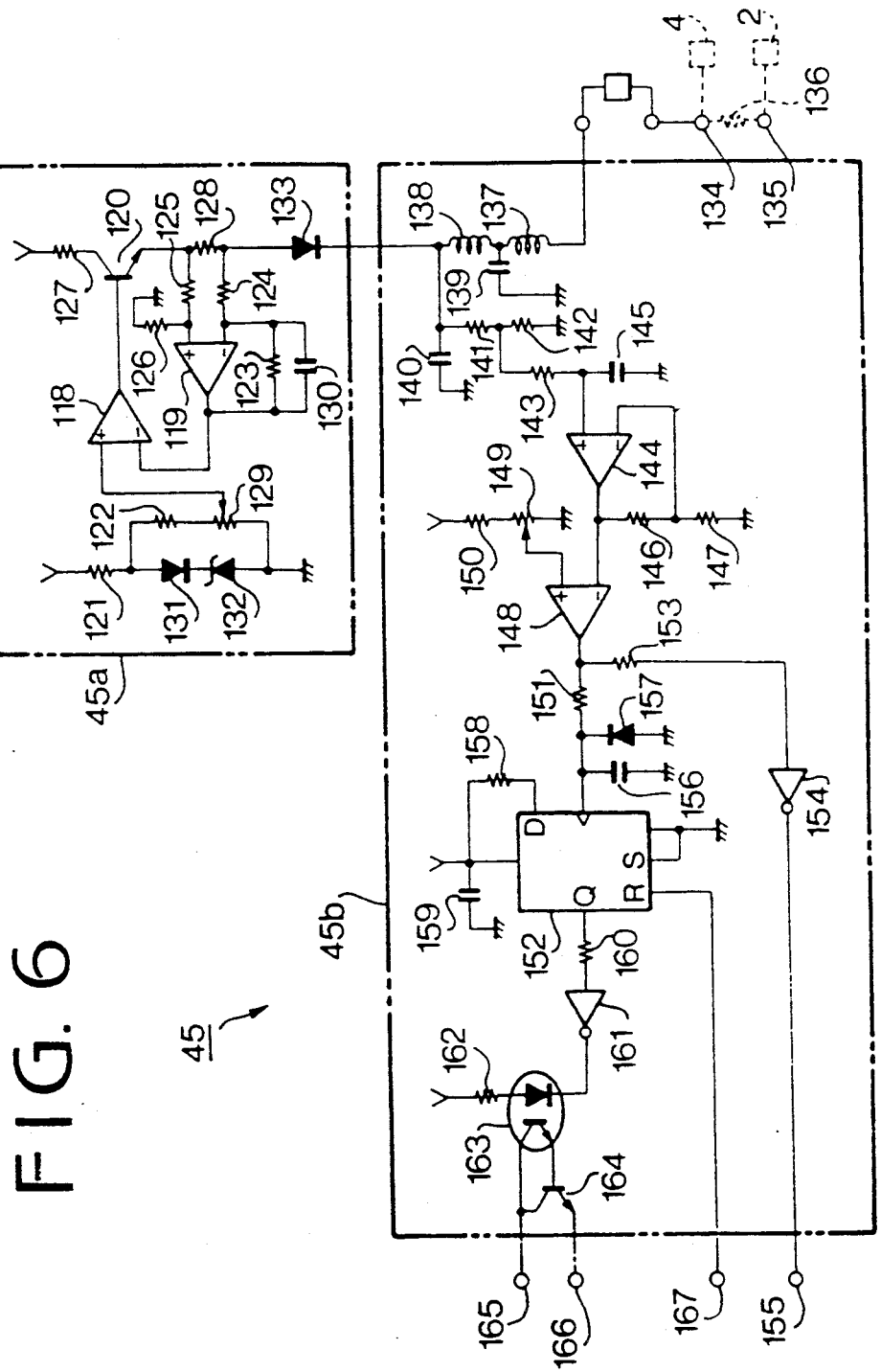
FIG. 6 shows circuits of a contact detector in the system.

Referring to FIG. 6, the contact detector 45 comprises a constant current generating section 45a and a contact detecting section 45b. The constant current generating section 45a comprises a pair of amplifiers 118 and 119, a transistor 120, eight resistors 121 to 128, a variable resistor 129, a capacitor 130 and three diodes 131 to 133.

A resistor 136 ( a low resistance, for example at 3 $\Omega$) is provided between a terminal 134 connected to the workpiece 4 and a terminal 135 connected to the electrode 2.

The contact detecting section 45b comprises a filter having a pair of coils 137 and 138, can a capacitor 139. The coil 137 is connected to the terminal 134. The coil 138 is connected to the ground through a capacitor 140 and resistors 141 and 142 connected to each other in series. A voltage divided by the resistors 141 and 142 is applied to one of inputs of an amplifier 144 through a resistor 143. The input of the amplifier 144 is connected to the ground through a capacitor 145. The other input of the amplifier 144 is connected to an output thereof through a resistor 146 and to the ground through a resistor 147. The output of the amplifier 144 is connected to one of inputs of an amplifier 148. The other input of the amplifier 148 is connected to the power source through a variable resistor 149 and a resistor 150.

An output of the amplifier 148 is connected to a trigger terminal of an FF 152 through a resistor 151 and to an input of an inverter 154 through a resistor 153. An output of the inverter 154 is connected to a buzzer terminal 155. When the electrode 2 contacts the workpiece 4, a buzzer (not shown) is turned on to give the alarm. The trigger terminal of the FF 152 is connected to the ground through a capacitor 156 and a diode 157, respectively. A terminal D of the FF 152 is pulled up by a resistor 158 which is connected to a capacitor 159 connected to the ground. An output Q of the FF 152 is connected to an input of an inverter 161 through a resistor 160. An output of the inverter 161 is connected to a photocoupler 163 which is connected to the power source through a resistor 162. An output of the photocoupler 163 is connected to a base of a transistor 164. Collector and emitter of the transistor 164 are connected to terminals 165 and 166 of the CPU 46, respectively. A terminal 167 is provided in the CPU 46 for resetting the FF 152.

The constant current generating section 45a produces a constant current which is applied to the resistor 136 between he terminals 134 and 135. When the electrode 2 comes into contact with the workpiece 4, the terminals 134 and 135 are short-circuited. The contact detecting section 45b detects an abnormal voltage and produces a signal which is applied to the CPU 46 through terminals 165 and 166 and to the alarm buzzer through the terminal 155 to give the alarm of the contact.

Figure 7B:
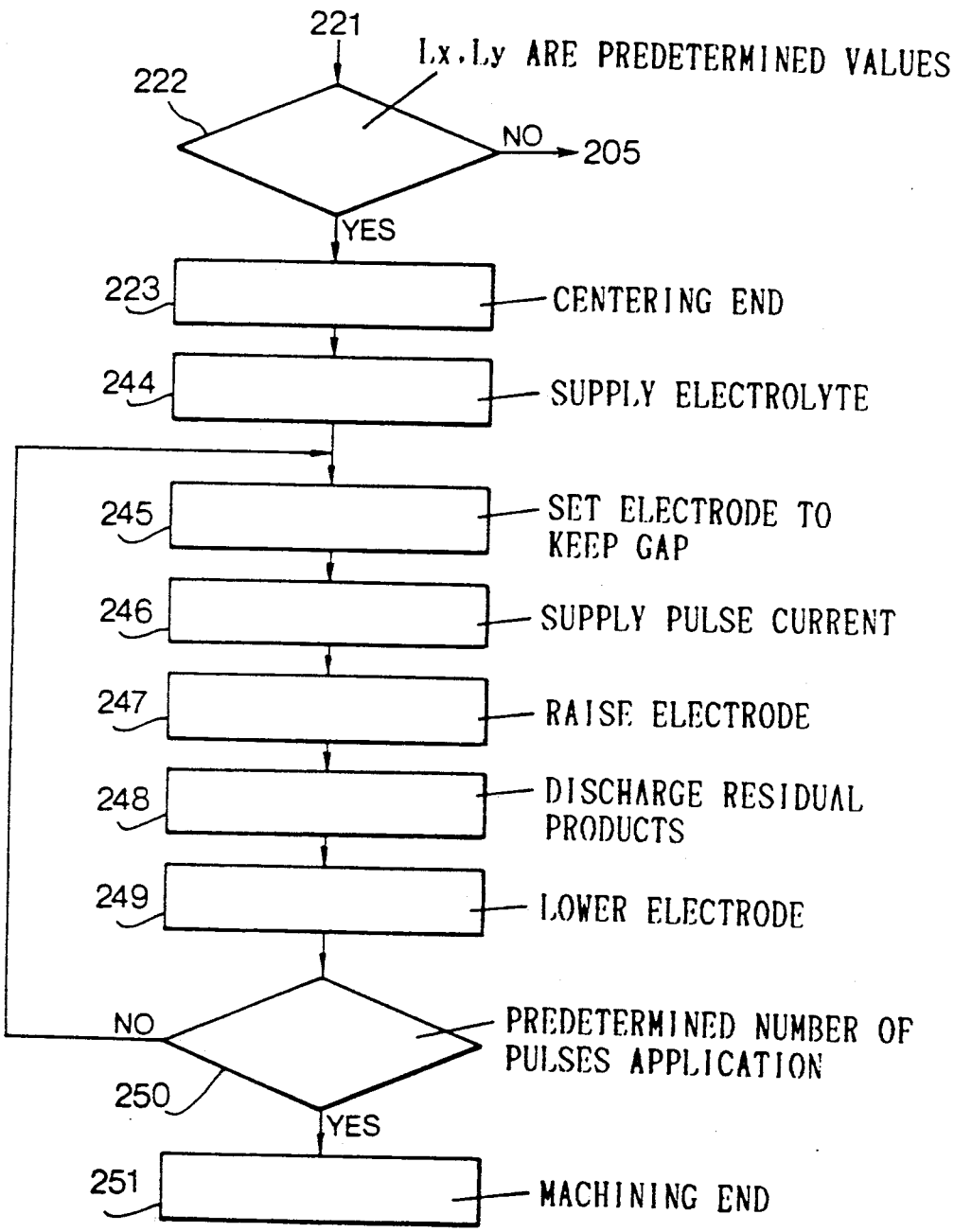

The centering method for the work 4 and the electrode 2 of the electrolytic finishing machine 1 will be described hereinafter with reference to the flowcharts of FIGS. 7a and 7b and the explanatory illustrations of FIGS. 8a to 8i.

Figure 8A:
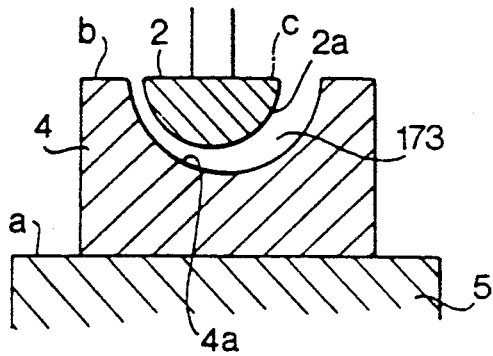
FIGS. 8a to 8i are explanatory illustrations showing an operation of a centering method.
Figure 8B:
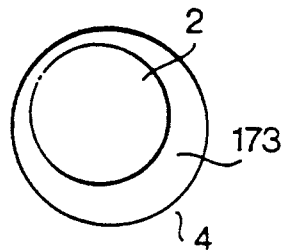

In order to start the centering operation (step 200), the work 4 is mounted on the work fixing device 5 and secured thereto such that a reference plane b of the work 4 (FIG. 8a) parallels a standard plane a of the fixing device 5 (step 201). The electrode 2 is attached to the rod of the electrode holding device 3 such that a reference plane c of the electrode 2 parallels the standard plane a of the fixing device 5 (step 202). The electrode 2 is lowered by the electrode driving device 6 (step 203) to position the electrode 2 in a work surface 4a (hereinafter called a recess 173) of the workpiece 4 as shown in FIGS. 8a and 8b. An electrode surface 2a is positioned opposite to the surface 4a. In this state, it is unnecessary to position surfaces 2a and 4a with accuracy. In accordance with the control signal from the control unit 12 based on the input operation by the input device 13, an automatic centering operation starts (step 204). The X-table of the X-Y table 20 is moved in the (−) X-axis direction (step 205). When the workpiece 4 contacts with the electrode 2 (FIG. 8c), the contact detector 45 detects the contact (step 206) and produces a signal which is applied to the CPU 46. Based on the input signal, the CPU 46 stores the X-Y coordinate of a standard point d of the workpiece 4 which is previously determined. In accordance with the signal from the CPU 46, the workpiece 4 is moved by a distance ΔX in the (+) X-axis direction and in the (−) X-axis direction to determine the disconnecting direction. More particularly, by moving the workpiece 4 in the both directions, the direction in which the workpiece 4 disconnects the electrode 2 (step 207) can be determined. When the disconnecting direction away from the electrode 2 is determined, the workpiece 4 is moved in the direction, here, in the (+) X-axis direction (step 208) to be contacted with the electrode 2 (step 209) (FIG. 8d) and the X-Y coordinate of the standard point d is stored in the CPU 46. In the step 207, the workpiece 4 may be moved in the (−) X-axis direction to contact with the electrode 2 and then automatically moved in the reverse direction, that is in the (+) X-axis direction.

Figures 8C, 8D, 8E:
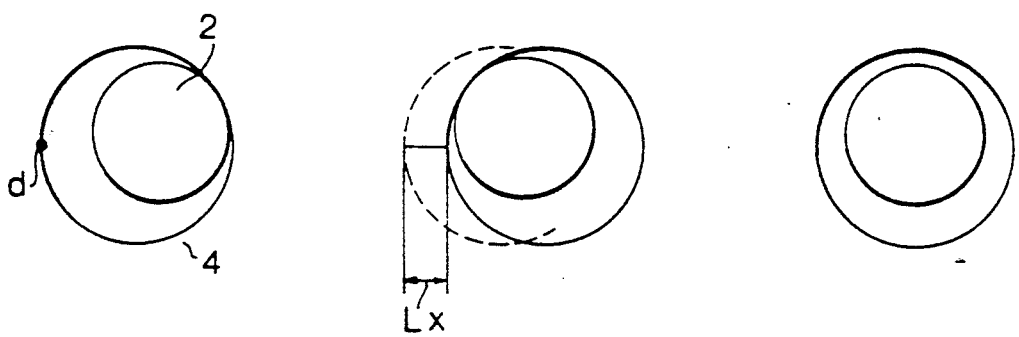

The CPU 46 calculates the moving distances Lx and Lx/2 of the work 4 based on the X-Y coordinate of the standard point d stored herein (step 210). Based on the calculated data, the workpiece 4 is moved from the contact position in the (−) X-axis direction by the amount Lx/2, that is in the disconnecting direction (step 211)(FIG. 8e). Thus, the centering of the workpiece 4 in the X-axis direction is completed.

The centering in the Y-axis direction is performed in the same manner, which will be described hereinafter.

Figure 8F:
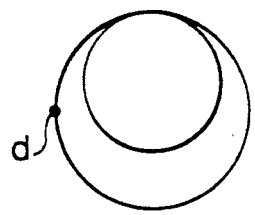
Figure 8G:
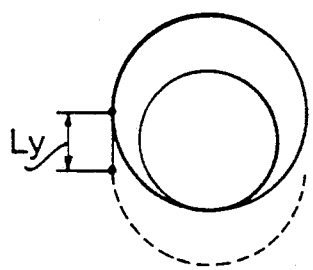
Figure 8H:
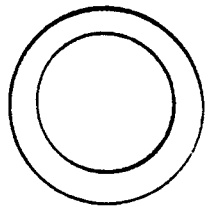
Figure 8I:
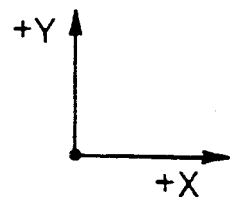

The workpiece 4 is moved in the (−) Y-axis direction (step 212) to detect the contact point with the electrode 2 (step 213)(FIG. 8f). The X-Y coordinate of the standard point d is stored in the CPU 46 and the disconnecting direction is determined (step 214). The workpiece 4 is moved in the (+) Y-axis direction, that is in the disconnecting direction (step 215). The contact is detected again (step 216)(FIG. 8g) and the X-Y coordinate as the contact position is stored in the CPU 46. From the coordinate of the contact position, the moving distance Ly and Ly/2 of the work 4 in the Y-axis direction are calculated (step 217). The workpiece 4 is moved in the (−) Y-axis direction by Ly/2 (step 218)(FIG. 8h).

The CPU 46 produces the control signal which is applied to the electrode driving device 6, so that the electrode 2 is lowered by the motor 19 (step 219) to be contacted with the work 4 (step 220). The electrode 2 is raised by a predetermined distance (step 221). At the step 221, the raising distance of the electrode 2 is set to a value smaller than the lowering distance of the electrode 2. It is determined whether each of the moving distance Lx and Ly of the workpiece 4 calculated at steps 210 and 217 is within a predetermined value or not (for example, 0.01 mm)(step 222). If one of the moving distances is not within the predetermined value, the program is returned to the step 205 and the program from the steps 205 to 221 is repeated until the moving distance become within the predetermined value at the step 222. When the centering operation finishes (step 223), the machining program starts.

Describing the finishing machining, the electrolyte filtering device 14 is operated to supply the electrolyte to the tank 15 (step 244).

The electrode 2 is set to a position to maintain a predetermined initial gap 6 input by the input device 13 (step 245). When the electrolyte in the gap 23 becomes stationary, a single pulse current, which has a predetermined peak current density and a pulse width based on the surface area S of the workpiece 4 is applied between the electrode 2 and the workpiece 4 (step 246). After a predetermined number of pulses are applied, the electrode 2 is raised to expand the gap 23 (step 247). Clean electrolyte is injected from the nozzle 172 to the gap 23, thereby removing the residual products from the gap 23 and the tank 15 (step 248).

After the draining of the electrolyte, the electrode 2 is lowered (step 249).

It is determined whether a predetermined number of pulses are applied or not (step 250). If the predetermined pulses are not applied, the process returns to the step 245. Thus, the above described machining (steps 245 to 250) is repeated until the predetermined pulses are applied at the step 250 and the finishing machining is completed at a step 251.

In accordance with the present embodiment, since the process is repeated until the moving distance Lx and Ly become within the predetermined values, the workpiece 4 is operated to converge to the position having a predetermined distance so that the centering of the workpiece 4 with the electrode 2 is automatically performed.

In this embodiment, although the process at the step 219 for lowering the electrode is continuously and automatically performed after the step 218, the process at the step 219 may be performed by manually operating a button.

Figure 9B:
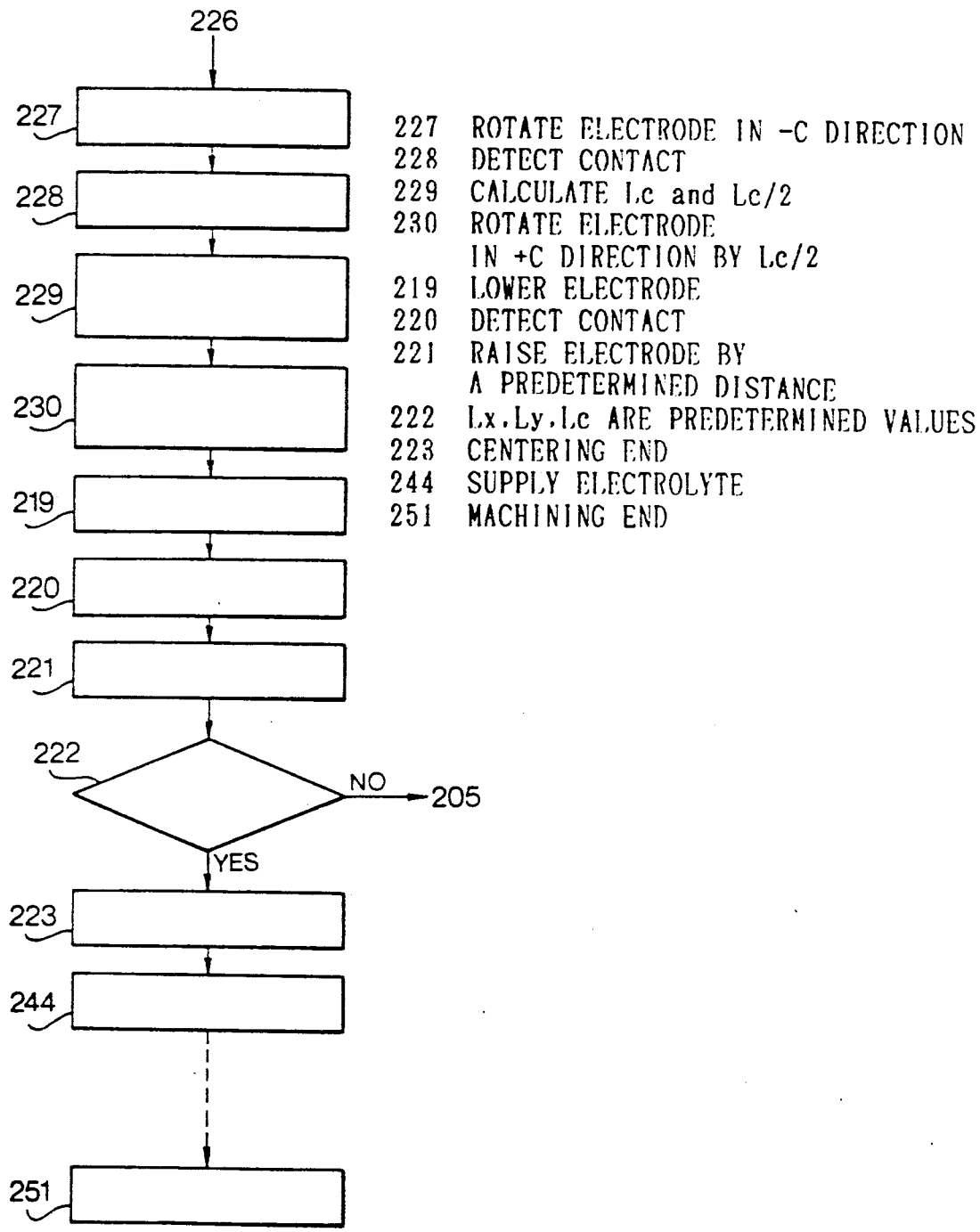

FIGS. 9a and 9b show the second embodiment, which will be described hereinafter with reference to FIGS. 10a to 10j. The same steps in the flowchart of the first embodiment are identified with the same reference numerals as FIGS. 7a and 7b.

Figure 10A:
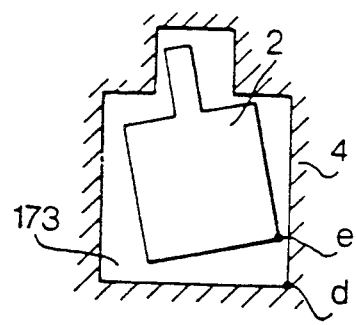
FIGS. 10a to 10j are explanatroy illustrations of the second embodiment.
Figure 10B:
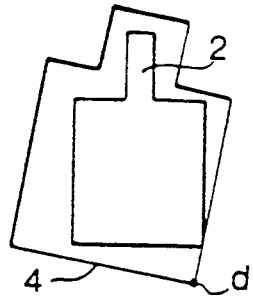
Figure 10C:
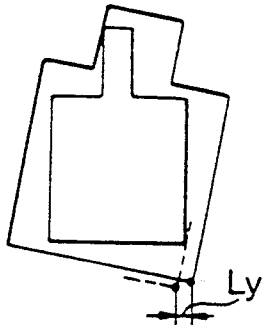
Figure 10D:
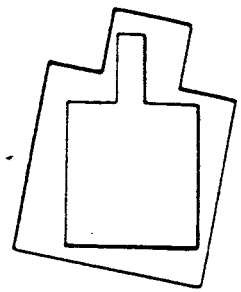
Figure 10E:
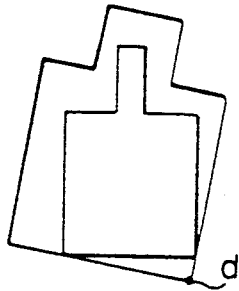
Figure 10F:
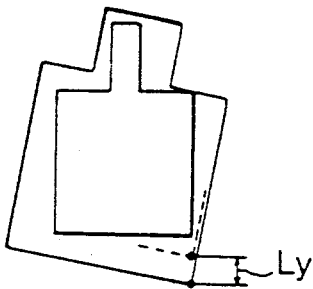
Figure 10G:
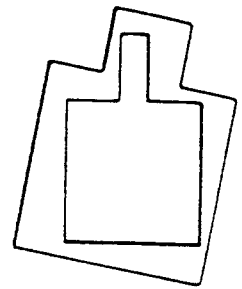
Figure 10H:
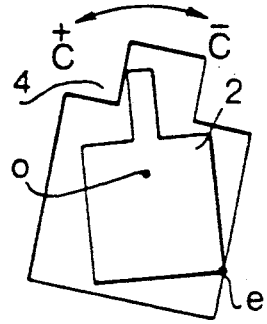
Figure 10I:
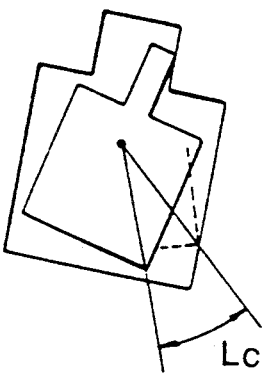
Figure 10J:
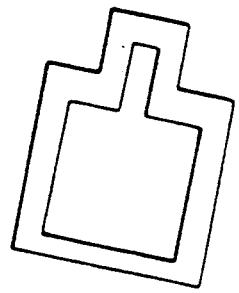

The centering in the X-axis and Y-axis directions are performed at steps 200 to 218 (FIGS. 10a to 10g). Thereafter, in accordance with the control signal from the CPU 46, the electrode 2 is rotated in the (+) C direction (step 224). When the electrode 2 contacts with the workpiece 4 (step 225)(FIG. 10h), the X-Y coordinate of a standard point e of the electrode 2 is stored in the CPU 46 to determine the disconnecting direction from the workpiece 4 (step 226). The electrode 2 is rotated in the (−) C direction (step 227) to contact with the workpiece 4 (step 228)(FIG. 10i) and the position is stored in the CPU 46. The CPU 46 calculates rotating angles Lc and Lc/2 based on the stored data of the position (step 229). The electrode 2 is rotated in the disconnecting direction, that is in the (+) C direction by the angle Lc/2 (step 230)(FIG. 10j). Thereafter, the finishing machining is performed at steps 244 to 251. In this embodiment, the moving distances Lx, Ly and the angle Lc are determined at the step 222.

In the second embodiment, the centering in the C direction as well as X-axis and Y-axis directions is performed. Therefore, it is effective to center work and electrode, each having an indented surface such as a gear. Thus, the centering time can be reduced.

In the flowcharts of FIGS. 7a and 7b and FIGS. 9a and 9b of the first and second embodiments, although it is determined at the step 222 whether the moving distances such as Lx and Ly are predetermined values or not, a predetermined number N (the number of the repetition) is previously input by the input device 13 and the step 222 may determine whether the predetermined number N is repeated or not.

Figure 11B:
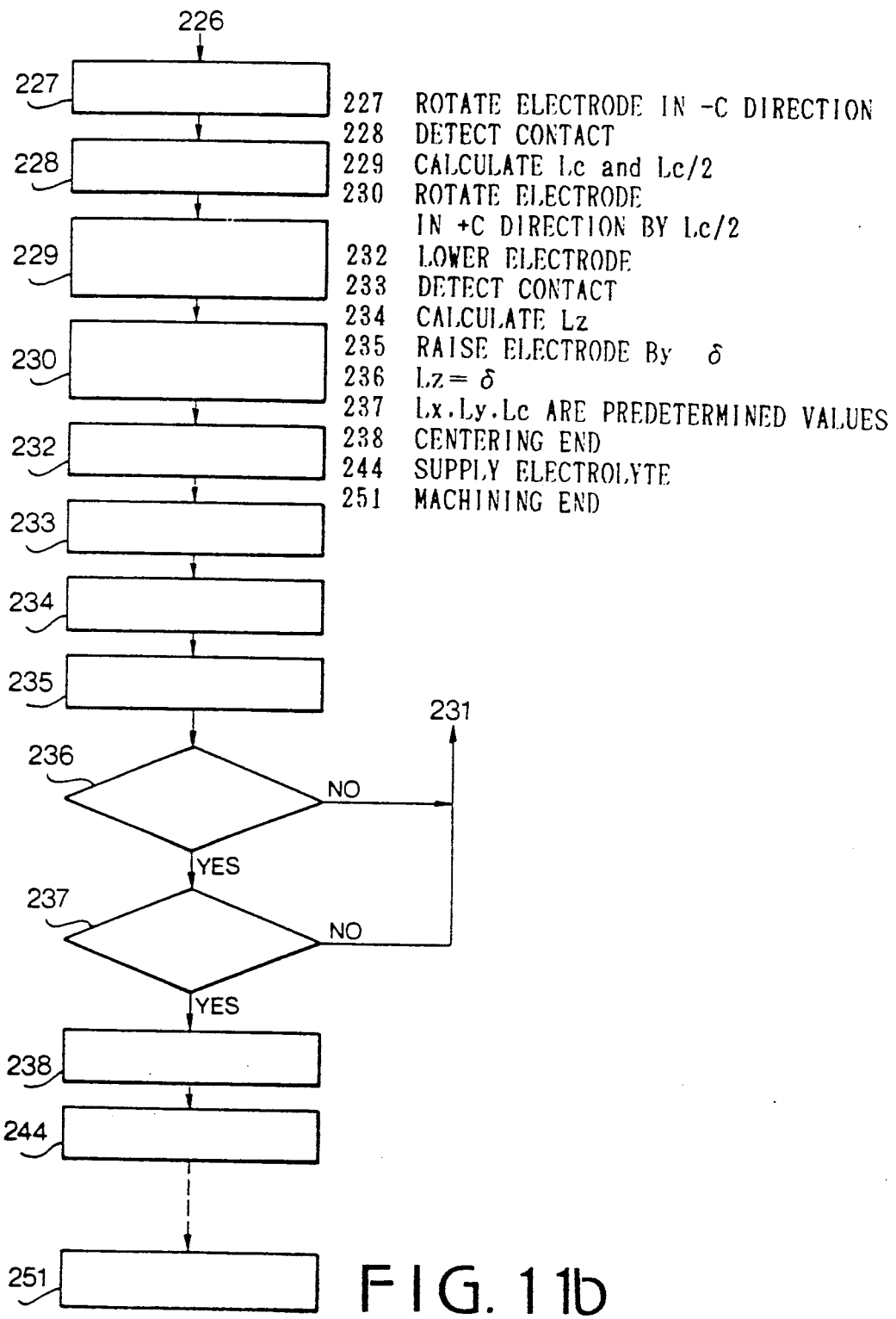

FIGS. 11a and 11b show the flowchart of the third embodiment. The third embodiment is characterized in that the gap δ is automatically set as well as the centering of the work 4 and the electrode 2. The centering operation starts at the step 204. At a step 231, the CPU 46 operates to store a set position of the electrode 2 in the Z-axis direction. After the centerings in the X-axis, Y-axis, and C-directions are performed at steps 205 to 218, and steps 224 to 230 respectively, the electrode 2 is lowered by the driving device 6 (step 232) to be contacted with the workpiece 4 and the position of the electrode 2 is detected (step 233). In accordance with the detected position and the position stored at the step 231, the lowering distance Lz of the electrode 2 is calculated (step 234). The electrode 2 is raised by the distance δ which is previously input by the input device 13 (step 235). The lowering distance Lz is compared with the gap δ and it is determined whether the difference in dependency on the comparison is a predetermined value (for example, 0 mm) or not (step 236).

If not, the program is returned to the step 231 where the position of the electrode 2 in the Z-axis direction at the step 235 is stored. The process is repeated. If yes at the step 236, it is determined whether the moving distances Lx, Ly and Lc calculated at steps 210, 217 and 229 are predetermined values or not (step 237). If not, the program is returned to the step 231. If yes, the centering operation is completed (step 238).

In this embodiment, since the gap between the workpiece and the electrode is automatically set simultaneous with the centering, it is effective to center the workpiece having a three-dimensional shape and the electrode.

In the present invention, although the travels in the X-axis direction and the Y-axis direction are performed by the work 4 and in the C direction and the Z-axis direction are performed by the electrode 2, the travels in the respective directions can be performed either of the workpiece 4 and the electrode 2. Further, the centering order in the respective directions can be changed.

PROBABILITY OF INDUSTRIAL EXPLOITATION

The centering of the electrode and the workpiece is automatically performed, so that the time for centering the workpiece having a three-dimensional shape and the electrode can be reduced, thereby remarkably reducing the finishing machining time. Further, the centering of the workpiece having a three-dimensional shaped recess and the electrode is automatically performed.

We claim:

1. A method for centering in an electrolytic finishing system comprising:

locating a workpiece and an electrode having a surface similar to the workpiece in profile in parallel with a standard plane and fixing them;

lowering the electrode to oppose the surface of the electrode to a working surface of the workpiece;

moving the workpiece and the electrode relative to each other in one direction on an X-axis, to contact each other;

detecting a first contact position;

determining a first disconnect direction;

moving the workpiece and the electrode relative to each other in the first disconnect direction until they contact each other;

detecting a second contact position;

calculating a moving distance Lx of the workpiece and the electrode relative to each other in the X-axis between said first and said second contact positions;

moving the workpiece and the electrode relative to each other in the one direction by Lx/2;

moving the workpiece and the electrode relative to each other in one direction on a Y-axis to contact each other;

detecting a third contact position;

determining a second disconnect direction;

moving the workpiece and the electrode relative to each other in the second disconnect direction until they contact each other;

detecting a fourth contact position;

calculating a moving distance Ly of the workpiece and the electrode relative to each other in the Y-axis between said third and fourth contact positions;

moving the workpiece and the electrode relative to each other in the one direction by Ly/2;

lowering the electrode to contact the workpiece, and then raising the electrode by a fixed distance.

2. The method for centering according to claim 1, further comprising:

rotating the workpiece and the electrode relative to
each other in one direction with respect a Z-Axis to
contact each other;
detecting a fifth contact position;
determining a third disconnect direction;
rotating the workpiece and the electrode relative to
each other in the third disconnect direction until
they contact each other;
detecting a sixth contact position;
calculating a rotating angle Lc of the workpiece and
the electrode relative to each other between said
fifth and sixth contact positions;
rotating the workpiece and the electrode relative to
each other in the one direction by Lc/2.

* * * * *